United States Patent [19]

Wijntjes et al.

[11] Patent Number: 5,098,190
[45] Date of Patent: Mar. 24, 1992

[54] METEROLOGY USING INTERFEROMETRIC MEASUREMENT TECHNOLOGY FOR MEASURING SCALE DISPLACEMENT WITH THREE OUTPUT SIGNALS

[75] Inventors: Geert J. Wijntjes, Chelsea; Michael Hercher, Marblehead, both of Mass.

[73] Assignee: Optra, Inc., Beverly, Mass.

[21] Appl. No.: 390,192

[22] Filed: Aug. 7, 1989

[51] Int. Cl.$^5$ .............................................. G01B 9/02
[52] U.S. Cl. ................................. 356/356; 250/231.16; 250/237 G
[58] Field of Search ..................... 356/345, 356, 358; 250/231.16, 237 G

[56] References Cited

U.S. PATENT DOCUMENTS

| | | |
|---|---|---|
| 3,523,735 | 8/1970 | Taylor . |
| 4,631,416 | 12/1986 | Trutna, Jr. . |
| 4,676,645 | 6/1987 | Taniguchi . |
| 4,710,026 | 12/1987 | Magome . |
| 4,728,193 | 3/1988 | Bartelt . |
| 4,764,014 | 8/1988 | Makosch . |
| 4,776,698 | 10/1988 | Crosdale ........................... 356/345 |
| 4,776,701 | 10/1988 | Pettigrew . |
| 4,815,850 | 3/1989 | Kanayama . |
| 4,815,854 | 3/1989 | Tanaka . |
| 4,828,392 | 5/1989 | Nomura . |

OTHER PUBLICATIONS

Mertz, "Complex Interferometry", *Applied Optics*, vol. 22, No. 10, May 15, 1983.

Hercher, et al., "Design of Optical Systems", *Proceedings of SPIE—The International Society for Optical Engineering*, vol. 741, pp. 174-185 (1987).

*Primary Examiner*—Samuel Turner
*Attorney, Agent, or Firm*—Fish & Richardson

[57] ABSTRACT

A metrology system includes means for generating an interference fringe pattern as a function of a parameter to be measured, transducer apparatus for simultaneously generating three intensity-modulated optical signals, $I_R$, $I_S$ and $I_T$, that are related to the interference fringe pattern; signal processing apparatus for accurately determining an aspect of the interference fringe pattern from the three signals; means for accumulating phase information proportional to the aspect of the interference fringe pattern; and means for converting the accumulated phase and aspect information to desired outputs indicative of the parameter to be measured.

31 Claims, 4 Drawing Sheets

METEROLOGY USING INTERFEROMETRIC MEASUREMENT TECHNOLOGY FOR MEASURING SCALE DISPLACEMENT WITH THREE OUTPUT SIGNALS

This invention relates to metrology and more particularly to interferometric measurement technology.

Interferometric measurement technology is useful in a number of fields. For example, interferometric measurement technology is used in the precise measurement of the linear displacement of material components, such as in the manufacture of machined metal parts, optically finished components and semiconductor integrated circuits. In making such displacement measurements, two techniques are currently in wide use: laser interferometry, in which the displacement of a mirror (attached to the part whose displacement is to be measured) is measured with a precision on the order of 1/16-wavelength (about 1.5 microinches); and linear encoders, in which a scale is attached to the moving part, and its position is read out with a precision on the order of $\frac{1}{8}$-scale division (or about 126 microinches for a 1000 line/inch scale). The ultimate precision of this technique is on the order of 50 to 100 microinches. Laser interferometry is very accurate and precise but requires a stabilized laser, elaborate optical components, and considerable expertise in its application. Linear encoders are robust and simple to use, but are limited in their precision by (a) difficulty in interpolating to better than $\frac{1}{8}$-scale division, and (b) difficulty in manufacturing and reading out very fine scales (e.g. more than 2000 lines/inch).

In accordance with an aspect of the invention, there is provided a metrology system that includes means for generating an interference fringe pattern as a function of a parameter to be measured, transducer apparatus for simultaneously generating three intensity-modulated optical signals, $I_R$, $I_S$ and $I_T$, that are related to the interference fringe pattern; signal processing apparatus for accurately determining an aspect of the interference fringe pattern from the three signals; means for accumulating phase information proportional to the aspect of the interference fringe pattern; and means for converting the accumulated phase and aspect information to desired outputs indicative of the parameter to be measured.

The transducer generated optical intensity signals, $I_R$, $I_S$ and $I_T$, which under ideal circumstances differ only in their phases $\Phi$, may be expressed by the following relationships:

$$I_R = I_1 + I_2 \cos(\Phi - 2\pi/3), \quad (1)$$

$$I_S = I_1 + I_2 \cos(\Phi), \text{ and}$$

$$I_T = I_1 + I_2 \cos(\Phi + 2\pi/3),$$

from which the instantaneous value of the parameter of interest (such as the displacement of a scale relative to the transducer apparatus can be uniquely determined. The specific relationship between scale position, x, and phase, $\Phi$, (the phase angle $\Phi$ carrying the basic interferometric measurement information, which in a typical case is lateral displacement, x) being given by:

$$\Phi = \Phi_o + 2\pi x/d \text{ radians}, \quad (2)$$

where d is the separation between adjacent rulings on the scale, and $\Phi_o$ is a constant.

In terms of R, S, and T (the electrical signals corresponding to the optical intensity signals $I_R$, $I_S$, and $I_T$, respectively), ratios A, B, and C are defined by:

$$A = (R-S)/(T-S), \quad (3)$$

$$B = (S-T)/(R-T), \text{ and}$$

$$C = (T-R)/(S-R).$$

Concerning these ratios, two factors are immediately obvious: (a) the ratios are independent of the DC light level, $I_1$ (since both numerators and denominators are differences between pairs of signals), and (2) they are independent of the AC-amplitude, $I_2$. In fact, combining equations (1) and (2), we find that the ratios are simple functions of the phase $\Phi$ alone:

$$A = 1 + \sqrt{3/} \tan \Phi, \text{ etc.} \quad (4)$$

FIG. 1 shows the signals R, S, and T and the ratios A (o), B(□), and C(^) over a $2\pi$ range of phase angles. Over each $\pi/3$ (60°) phase interval, one of the three ratios (A, B, or C) is a very nearly linear function of the phase angle $\Phi$. For example, over the first 60° interval the phase can be written as:

$$\Phi \approx (\pi/3)\cdot(1-C). \quad (5)$$

More generally, this linear approximation for $\Phi$ can be expressed as shown in the following table, which includes values of the Boolean quantities (R>T), (S>R), and (T>S).

| $\phi$-Range | (R > T) | (S > R) | (T > S) | $\phi$APPROX |
|---|---|---|---|---|
| 0°–60° | 1 | 0 | 1 | $(\pi/3)(1-C)$ |
| 60°–120° | 0 | 0 | 1 | $(\pi/3)(2-A)$ |
| 0°–180° | 0 | 1 | 1 | $(\pi/3)(3-B)$ |
| 180°–240° | 0 | 1 | 0 | $(\pi/3)(4-C)$ |
| 240°–300° | 1 | 1 | 0 | $(\pi/3)(5-A)$ |
| 300°–360° | 1 | 0 | 0 | $(\pi/3)(6-B)$ |

The sextant in which the phase angle lies is uniquely determined by the tabulated Boolean quantities. The ratios (R−S)/(T−S) etc. preferably are generated by single A/D converters that work by digitizing the quantity $(V_{in}-V_o)/(V_{ref}-V_o)$, where $V_{in}$ is the input voltage which is normally to be converted to a digital representation, $V_{ref}$ is a stable reference voltage to which the input voltage is to be compared, and $V_o$ is the ground level with respect to which $V_{in}$ and $V_{ref}$ are defined. In order to generate a digital representation of the ratio (R−S)/(T−S), for example, the following connections to the A/D converter may be made:

$$R \rightarrow V_{in}$$

$$S \rightarrow V_o, \text{ and}$$

$$T \rightarrow V_{ref}.$$

The three signals R, S, and T are efficently processed by a small number of circuit components such as preamps, A/D's, and digital logic chips to generate in real time a highly accurate digital signal which directly represents the measured interferometric phase, and hence the lateral displacement of the scale on the surface under observation. This digital signal can be readily converted to an analog signal to facilitate recording, interfacing to a spectrum analyzer, and temporal averaging (measurement bandwidth definition).

In accordance with another aspect of the invention, there is provided a metrology system that includes a scale for mounting on the component whose position is to be sensed; transducer apparatus for simultaneously generating three intensity-modulated optical signals, $I_R$, $I_S$ and $I_T$, that are related to the position x of the scale; electronic hardware for accurately determining the scale position from the three signals; means for accumulating phase information proportion to net displacement of the scale; and means for converting accumulated phase and position information to desired outputs indicative of scale displacement. In a preferred embodiment, the transducer apparatus includes a single-mode laser diode which produces a single beam of linearly polarized light that illuminates the scale structure; the scale structure is a ruled reflective device that has on the order of 20-2000 lines/inch; the transducer apparatus includes a lenticular screen of plastic, and each element of the lenticular screen is of cylindrical lens configuration. In other embodiments, the transducer apparatus includes a Wollaston prism and a half-wave plate or a prism beamsplitter assembly for collecting and bringing the two diffracted beams together again to form interference fringes.

In another embodiment, the system includes a crossed-grating scale to replace the linear scale for mounting on the component whose position is to be sensed; and similar transducer apparatus illuminates the crossed-grating scale and simultaneously generates six optical signals, $I_{Rx}$, $I_{Sx}$, $I_{Tx}$, $I_{Ry}$, $I_{Sy}$ and $I_{Ty}$, and from which both the x and y coordinates of the position of the scale structure may be determined.

In preferred embodiments, the signal processing apparatus includes electronic hardware with three detectors, three preamplifier circuits with adjustable gains coupled to the detectors for generating balanced signals R, S, and T; and phase processor apparatus to which the balanced signals R, S and T are applied, the phase processor apparatus comprising a plurality of A-D converters. In a particular embodiment, the electronic hardware further includes low-pass filter circuitry to which the balanced signals R, S and T are applied, each balanced signal being band limited with a uniform response from DC to at least 10 KHz. Preferably, the electronic hardware includes means for generating ratios A, B, and C, as defined by equation (3): In a particular embodiment, the ratios A, B, and C are generated by single A/D converters that work by digitizing the quantity $(V_{in}-V_o)/(V_{ref}-V_o)$, where $V_{in}$ is the input voltage, $V_{ref}$ is a stable reference voltage, and $V_o$ is the ground level with respect to which $V_{in}$ and $V_{ref}$ are defined; a digital representation of the ratio $(R-S)/(T-S)$ being generated by the following connections to an A/D-converter:

$R \rightarrow V_{in}$ $S \rightarrow V_o$, and $T \rightarrow V_{ref}$

Metrology systems in accordance with the invention are useful in numerous fields, including lateral and angular displacement applications, velocity measurements, surface profile and contour measurements, and in applications involving the measurement of electric or magnetic field strengths.

Other features and advantages of the invention will be seen as the following description of particular embodiments progresses, in conjunction with the drawing, in which.

DESCRIPTION OF PARTICULAR EMBODIMENTS

Figure 1:
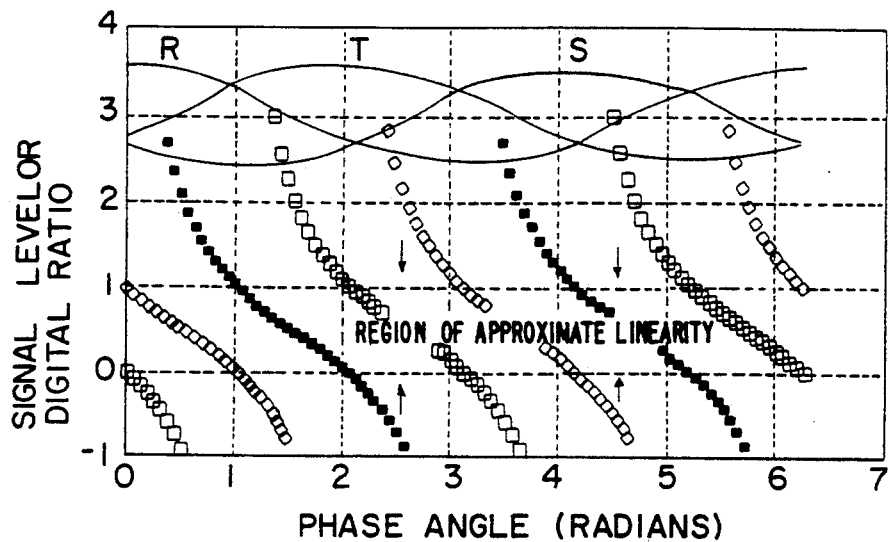
FIG. 1 is a graph of signal levels and digital ratios as a function of phase angle that are produced with a metrology system in accordance with the invention.
Figure 2:
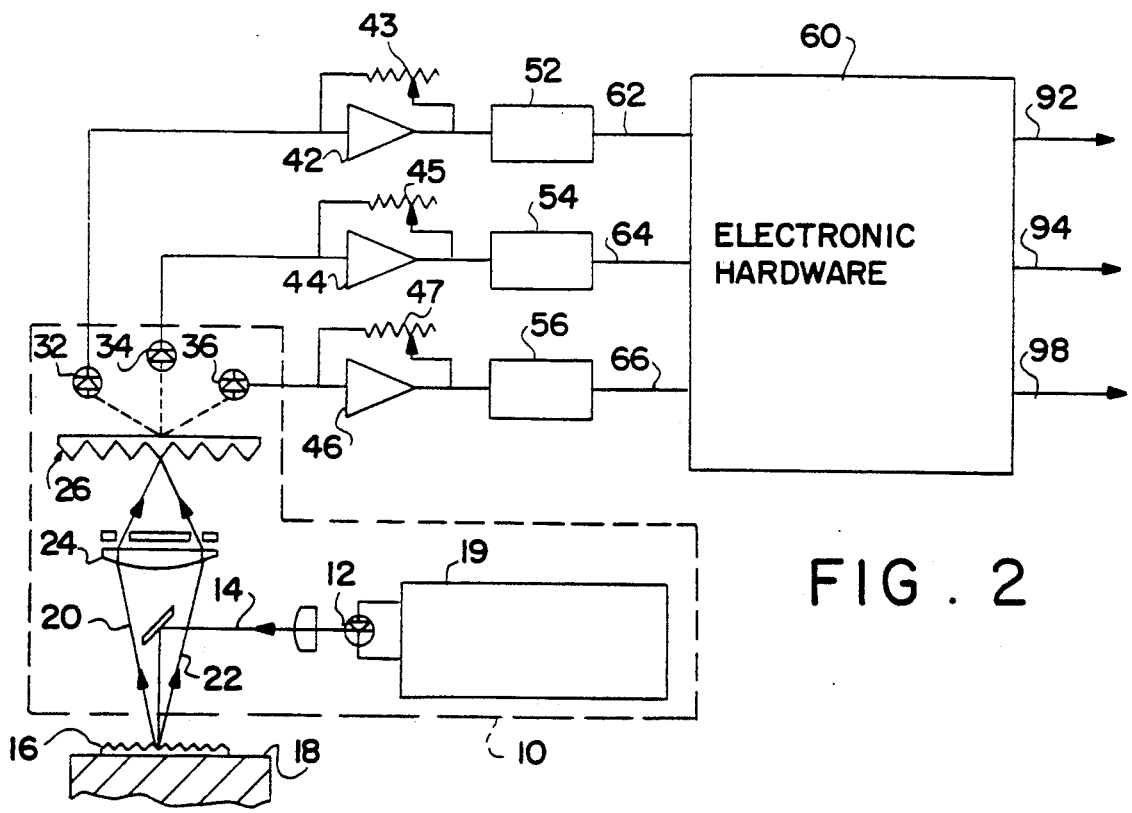
FIG. 2 is a block diagram of a metrology system in accordance with the invention.

FIG. 2 is a block diagram of a measurement system in accordance with the invention. Sensor head 10 includes laser diode 12 which produces a single beam 14 of linearly polarized light that illuminates ruled scale reflective grating (linear encoder) 16 (1250 lines/inch) which is attached to surface 18 to be observed. If desired, the laser diode 12 can be protected from optical feedback by the insertion of an optical isolator (not shown) located along beam path 14. The laser diode 12 has an estimated lifetime for use at ambient temperatures in excess of 40,000 hours. Power requirements are modest and power supplies can be obtained on single chips from the same manufacturers that make the diodes. Diode 12 typically requires a 5 VDC supply 19 and draws approximately 100 milliamperes to produce a ten milliwatt laser output.

Two diffracted beams 20, 22, at equal angles on either side of the incident beam 12, are directed by lens 24 to form an interference fringe pattern in the plane of lenticular grating 26. As the surface 18 and attached scale 16 move laterally, the optical paths for the two diffracted beams 20, 22 are differentially changed—causing the interference fringe pattern 28 in the plane of the lenticular grating 26 to move laterally. The optical design of the system makes it inherently insensitive to out-of-plane motions of the surface (excessive out-of-plane displacements will eventually cause loss of signal). The light which is refracted and diffracted by lenticular grating 26 produces three phase-shifted signals that fall on three approximately positioned silicon PIN-detectors 32, 34, 36. The relatively large signal levels from the detectors are applied to preamps 42, 44, 46 that have adjustable gains 43, 45, 47, respectively, which are set to generate the balanced signals R, S, and T on lines 62, 64, 66, each signal being band-limited by a low-pass filter 52, 54, 56, respectively, with a uniform response from DC to half the desired sampling frequency.

In one embodiment, three comparators follow the filters 52, 54, 56 and serve to address a high-speed analog switching unit by making determinations of the Boolean quantities (R>T), (S>R), and T>S). These Boolean values are then processed by a logical switching unit which determines which of the signals (R, S, T) are sent to which terminals ($V_{in}$, $V_{ref}$, $V_o$) of a 16-bit analog to digital converter. The analog to digital converter generates digital ratios A=(R−T)/(S−T) etc. The update rate of the analog to digital converter is set by a clock whose speed defines the sampling rate. The 16-bit data stream from the analog to digital converter is combined with a 3-bit data stream from a 3-bit logic unit (which determines in which sextant the phase angle lies) to provide a 19-bit input to an output digital to analog converter which defines the measured phase angle modulo $2\pi$.

Figure 5:
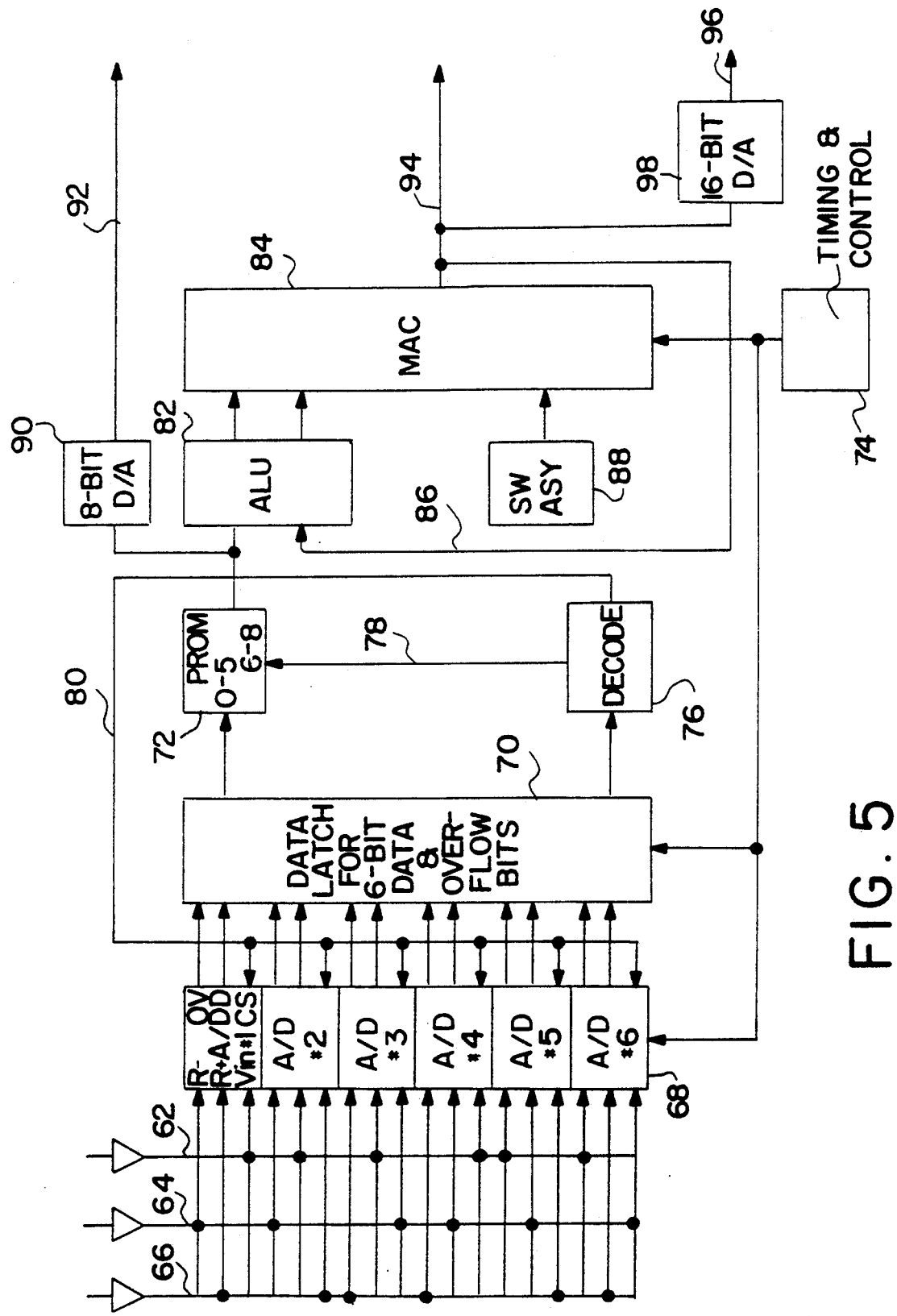
FIG. 5 is a block diagram of electronic hardware employed in the metrology system of FIG. 2.

In another embodiment, the balance signals R, S, and T from low-pass filters 52, 54, 56 are applied on lines 62, 64, 66 to electronic hardware 60, details of which are shown in FIG. 5, and outputs are produced on lines 92, 94 and 98.

The output data can be recorded either in digital signal form or, after conversion by a high-speed digital to analog converter, as an analog signal. The analog output can serve as the input to standard laboratory instruments, for example a real-time (FFT) spectrum analyzer, or it can be recorded for subsequent analysis.

Figure 3:
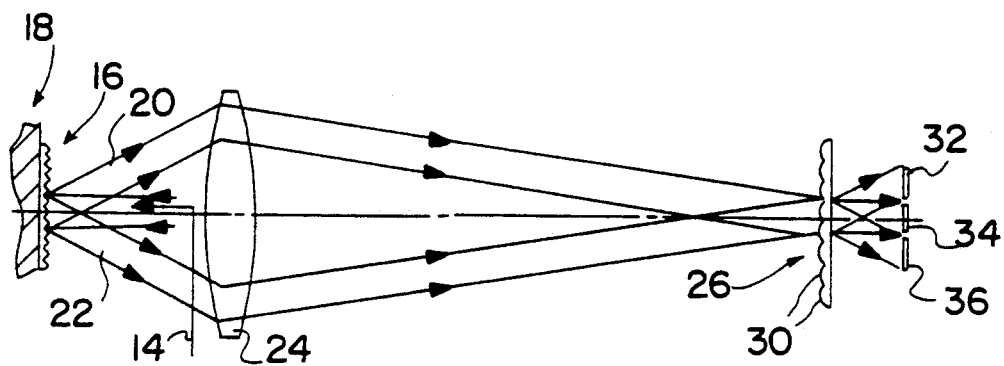
FIG. 3 is an optical diagram of transducer apparatus employed in the metrology system of FIG. 2.
Figure 4:
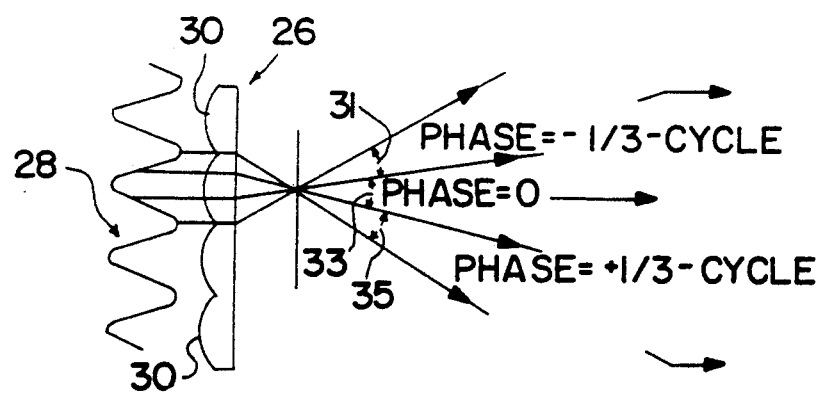
FIG. 4 is a diagram of portions of the transducer apparatus of FIG. 3.

FIG. 3 shows the basic optical layout of the sensor head 10, and FIG. 4 illustrates the manner in which the lenticular grating 26 is used to generate the three signals R, S, T, which differ in phase from one another by $2\pi/3$. In FIG. 3, the narrow collimated beam 14 from the laser diode 12 is normally incident on the surface of the reflective scale 16 which is attached to the surface 18. The scale 16 itself is a standard photolithography reproduced scale with a scale constant of 1250 lines/inch, so that the ruling spacing is 20.3 microns, and the ±1 diffraction orders (for a 0.83 micron laser wavelength) are at angles of ±2.3° from the normal. The two diffracted beams 20, 22 are collected by lens 24 and brought together again at an angle such that the interference fringes formed have a spacing of 0.001 inch—matching the spacing of the lenticular grating 26. This angle is approximately 1.9°. The two beams 20, 22 diffracted by the scale 16 at the test surface 18 can be thought of as forming a virtual interference fringe pattern on the test surface equal to half the scale spacing; this fringe pattern is then imaged in the plane of the lenticular grating 26 with a magnification of 2.47, so that the image fringe spacing is 25.4 microns (0.001 inch).

The system may be described as sensing in-plane displacements in terms of Doppler shifts. If surface 18 is moving upward (in FIG. 3) with a velocity v, then the upper and lower diffracted beams experience frequency shifts of ±v(V/C) sinΘ respectively, where $v$ is the frequency of the light. When these two beams are brought together to interfere, their intensity is modulated at the difference frequency $\Delta v$;

$$\Delta v = 2(v/c)v. \sin \Theta. \quad (5)$$

After surface 18 moves a distance Δx, in a time Δt=x/v, the phase of the intensity modulation will have changed by an amount ΔΦ:

$$\Delta\Phi = 2\pi.\Delta v.\Delta t = 2\pi.\Delta x.(2 \sin \Theta/\lambda) \quad (6)$$

or $\Delta\Phi = 2\pi\Delta x/d$, where $\lambda=c/v$ is the wavelength, and $d=\lambda/(2\sin\Theta)$ is the virtual fringe spacing. Thus the interferometric phase change ΔΦ is a direct measure of the in-plane displacement Δx. This system configuration is insensitive to surface displacement components normal to surface 18: these displacements cause identical Doppler shifts for both interfering beams to that the resultant difference frequency is zero.

Lenticular grating 26 is a relatively coarse grating (1000 lines/inch) of plastic in which each grating element 30 is a cylindrical lens. The way lenticular screen 26 generates multiphase signals is shown in FIG. 4: by matching the interference fringe spacing to the lenticular grating spacing (0.001" or 25.4 microns), one full cycle of each fringe illuminates each individual lenticular element. By the inherent nature of an interference fringe pattern, the phase of the interference varies from $\Phi_o$ to $(\Phi_o+2\pi)$ across each individual fringe. As shown in FIG. 4, each cylindrical lens element 30 serves to direct light from each fringe into a different direction, depending on its location within the fringe, and hence on its phase. For the three collection angles shown in the Figure (one for each detector 32, 34, 36), the mean phase angles differ by ⅓-cycle, or $2\pi/3$ radians. Within any one collection angle, light of different phases is integrated.

Each lenticular grating element 30 works in precisely the same way, and their combined output leads to a diffraction pattern in which there are many diffraction-orders contained in each of the three collection angles 31, 33, 35 (e.g. for a cylindrical lens focal length of 0.002", the input light is refracted into a wedge of about 33°, or about 11° for each detector element: within each 11° section, there are six diffraction orders).

FIG. 5 shows the phase processor 60 to which the incoming signals R, S and T on lines 62, 64, 66 as defined by equation (1) above are applied. A phase computation based on digital ratio measurements is carried out by 6-bit flash A-D converters 68 and the result is stored in latch 70. While in principle only three such A D converters are needed to compute the ratios A, B and C (defined by equation (3)), in practice, unipolar A-D converters 68 that can handle only positive inputs are used. Three additional A-D converters are connected with inverted inputs—to give valid data when (R−S), (S−T) or (T−R) are negative. This process leads to erroneous weighting of bits when there are negative signals, but is corrected by look-up table (PROM) 72. All six A-D converters 68 are simultaneously triggered at the 10 MHz data rate from timing and control circuit 74, but only one is selected—based on the Boolean logic table below:

| φ-Range | (R > T) | (S > R) | (T > S) | φAPPROX |
|---|---|---|---|---|
| 0°–60° | 1 | 0 | 1 | $(\pi/3)(1-C)$ |
| 60°–120° | 0 | 0 | 1 | $(\pi/3)(2-A)$ |
| 0°–180° | 0 | 1 | 1 | $(\pi/3)(3-B)$ |
| 180°–240° | 0 | 1 | 0 | $(\pi/3)(4-C)$ |
| 240°–300° | 1 | 1 | 0 | $(\pi/3)(5-A)$ |
| 300°–360° | 1 | 0 | 0 | $(\pi/3)(6-B)$ |

A convenient means for generating these Boolean values is to use the overflow bits from the A-D converters 68 when $V_{in}>V_{ref}$. These bits are applied to decoder 76 to select the appropriate 60° segment over line 78 to PROM 72 (i.e., provide 2.5 bits of phase resolution by resolving the phase to 1/6-cycle) while the remaining bits are provided over bus 80 to the selected A-D converter 68. The total number of bits of phase resolution is thus approximately 8.5 (2.5 from the sextant selection and six from the A-D converter 68), corresponding to a phase resolution of 1 part in 384. This phase resolution is available at the full data collection bandwidth of 10 MHz—depending on the quality of the electronic components. Further improvement in phase resolution is achieved by averaging (bandwidth reduction). For example, by working at 1 KhZ, the phase resolution can be improved from 1 part in 384 (at 1 MHz) to 1 part in 384,000. The ultimate limit to the phase resolution depends on either shot noise in the laser signal, or on transducer noise or instability.

A wide range of measurements require unwrapped phase measurements—i.e., phase measurements not having the modulo $2\pi$ restriction. To keep track of the number of whole cycles of phase, as well as the modulo $2\pi$ phase, 1-cycle count is added each time there is a 6-to-1 sextant transition, and a count is subtracted when there is a 1-to-6 sextant transition. With a simple digital phase locked loop comprised of ALU (arithmetic logic unit) module 82 and MAC (multiply and accumulate) module 84 in FIG. 5 (sixteen bits being fed back from module 84 to module 82 over lines 86), each incoming value of the phase (modulo/$2\pi$), $\Phi_i$, is used to generate a new output value of the accumulated phase, $\Phi_i$, which depends on both $\Phi_i$ and the previous output $\Phi_{i-1}$ $$\Phi_i = \Phi_{i-1} - (1/k)(\Phi_{i-1} - \Phi_i)_R, \quad (6)$$

where k is a recursion constant provided by circuit 88 and the subscript R denotes that the subscripted quantity is reduced to an integral of $\pm \frac{1}{2}$ cycle.

A monitor signal is provided by 8-bit digital to analog converter 90 over line 92, a 36-bit digital output is provided over lines 94, and an analog output is provided over line 96 by 16-bit digital to analog converter 98.

Figure 6:
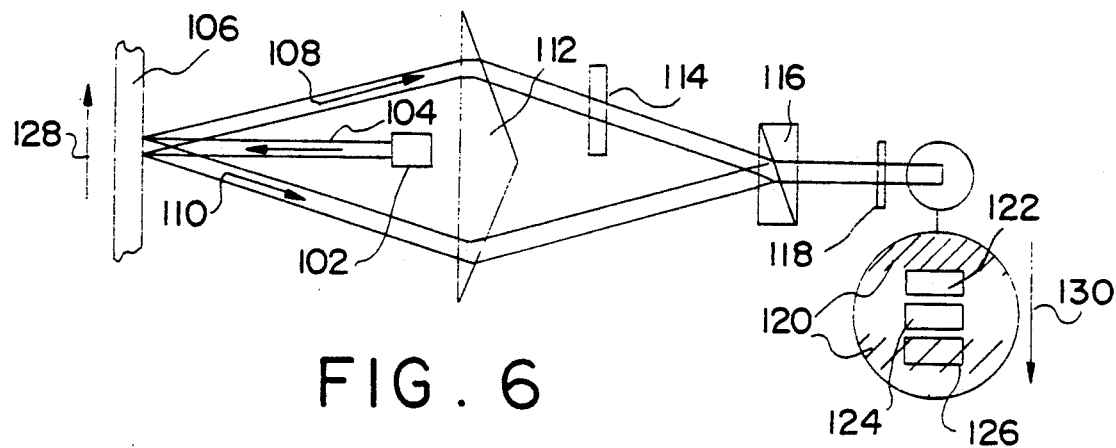
FIG. 6 is an optical diagram of another embodiment of transducer apparatus for use in the metrology system of FIG. 2.

In a second transducer embodiment, (shown in FIG. 6), the output of laser diode 102 is collimated into a narrow beam 104 which is normally incident on a ruled scale (linear encoder) 106. If desired, the laser diode 102 can be protected from optical feedback by the insertion of an optical isolator (not shown) located along beam path 104. The $\pm 1$ diffracted orders are reflected symmetrically in directions 108 and 110, and are redirected a shown by prism 112. A half-wave plate 114 is located in one of these collimated beams and is oriented so as to rotate the plane of polarization of the light by 90°. The two collimated beams intersect at the location of Wollaston prism 116. The Wollaston prism 116 differentially deviates the two incident and orthogonally polarized beams so that they emerge superposed and nearly parallel. These co linear beams pass through a linear polarizer 118 which is oriented at 45° to the incident polarizations. This polarizer 118 causes the two beams to interfere. The angle between the two nearly parallel beams can be finely adjusted by rotating the prism 116 about an axis perpendicular to the plane of the figure. This angle is adjusted so that approximately two interference fringes 120 are formed across the common diameter of the two beams. Detectors 122, 124 and 126 are located as shown in the plane of this interference fringe pattern. Their position is such that there is a $2\pi/3$ mean interferometric phase difference between the radiation falling on adjacent detectors. When the scale 106 is moved in direction 128, the interference fringes move in direction 130. A scale displacement equal to d/2 (where d is the spacing between adjacent scale rulings) causes the fringes to move by one fringe spacing—corresponding a $2\pi$ change in the interferometric phase. With suitable gain adjustments the electrical signals from the three detectors can be made to have precisely the form given by equation (1) above.

Figure 7:
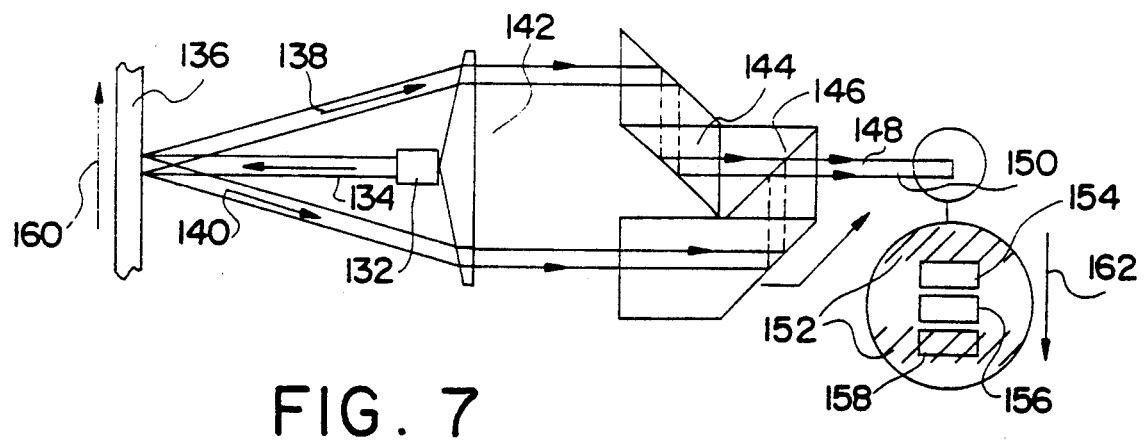
FIG. 7 is an optical diagram of still another embodiment of transducer apparatus for use in the metrology system of FIG. 2.

In a third form of transducer (shown in FIG. 7), linearly polarized light from a laser diode 132 is collimated into a narrow beam 134 which is normally incident on a ruled scale (linear encoder) 136. If desired, the laser diode can be protected from optical feedback by the insertion of an optical isolator (not shown) located along beam path 134. The $\pm 1$ diffracted orders are reflected symmetrically in directions 138 and 140, and are deviated so as to be approximately parallel by prism 142. The nearly parallel beams are brought into superposition by prism assembly 144 containing a beamsplitting surface 146 from which the two beams 148, 150 emerge superposed and traveling in approximately the same direction. The prism-beamsplitter assembly is designed to maintain optical path equality for the two beams. By rotating the prism 142 about an axis perpendicular to the paper, a small angle can be introduced between the two beams 148, 150 emerging from the prism-beamsplitter assembly. This angle is adjusted so that approximately two interference fringes 152 are formed across the common diameter of the two beams. Detectors 154, 156 and 158 are located as shown in the plane of this interference fringe pattern. Their position is such that there is a $2\pi/3$ mean interferometric phase difference between the radiation falling on adjacent detectors. When the scale is moved in direction 160, the interference fringes move in direction 162. A scale displacement equal to d/2 (where d is the inter-ruling spacing) causes the fringes to move by one fringe spacing—corresponding to $2\pi$ change in the interferometric phase. With suitable gain adjustments the electrical signals from the three detectors can be made to have precisely the form given by equation (1) above.

While particular embodiments of the invention have been shown and described, various modifications will be apparent to those skilled in the art, and therefore it is not intended that the invention be limited to the disclosed embodiments or to details thereof, and departures may be made therefrom within the spirit and scope of the invention.

What is claimed is:

1. A metrology system comprising
    a radiation source for directing a beam of radiation on a component whose parameter is to be measured, structure for producing two separate beams of radiation from portions of radiation modified by said component, optical structure for causing said two beams to interact and form an interference fringe pattern as a function of said parameter to be measured,
    transducer apparatus responsive to said interference fringe pattern for simultaneously generating three intensity-modulated optical signals, $I_R$, $I_S$ and $I_T$, that are related to said interference fringe pattern, signal processing apparatus for accurately determining an aspect of said interference fringe pattern from said three signals;
    means for accumulating phase information proportional to said aspect of said interference fringe pattern; and means for converting said accumulated phase and aspect information to desired outputs indicative of said parameter to be measured.

2. The system of claim 1 wherein said transducer apparatus includes a Wollaston prism and a half-wave plate.

3. The system of claim 1 wherein said transducer apparatus includes a prism-beamsplitter assembly.

4. The system of claim 1 wherein said three intensity-modulated optical signals, $I_R$, $I_S$ and $I_T$, are defined by the equations:

$$I_R = I_1 + I_2 \cos(\Phi - 2\pi/3),$$

$$I_S = I_1 + I_2 \cos(\Phi), \text{ and}$$

$$I_T = I_1 + I_2 \cos(\Phi + 2\pi/3),$$

where $I_1$ is the DC component and $I_2$ is the AC component.

5. The system of claim 1 wherein said signal processing apparatus includes means for generating ratios A, B, and C, as defined by:

$$A = (R-S)/(T-S),$$

$$B = (S-T)/(R-T), \text{ and}$$

$$C = (T-R)/(S-R),$$

where R is an electrical signal corresponding to the optical intensity signal $I_R$, S is an electrical signal corresponding to the optical intensity signal $I_S$, and T is an electrical signal corresponding to the optical intensity signal $I_T$.

6. The system of claim 5 wherein said means for generating ratios A, B, and C include single A/D-converters that work by digitizing the quantity $(V_{in} - V_o)/(V_{ref} - V_o)$, where $V_{in}$ is the input voltage, $V_{ref}$ is a stable reference voltage, and $V_o$ is the ground level with respect to which $V_{in}$ and $V_{ref}$ are defined, and circuitry for generating a digital representation of the ratio $(R-S)/(T-S)$ includes the following connections to an A/D-converter:

$$R \rightarrow V_{in}$$

$$S \rightarrow V_o, \text{ and}$$

$$T \rightarrow V_{ref}.$$

7. The system of claim 5 wherein said signal processing apparatus further includes means for generating the Boolean logic values set out in the Boolean logic table below:

| φ-Range | (R > T) | (S > R) | (T > S) | φAPPROX |
| --- | --- | --- | --- | --- |
| 0°-60° | 1 | 0 | 1 | (π/3)(1-C) |
| 60°-120° | 0 | 0 | 1 | (π/3)(2-A) |
| 0°-180° | 0 | 1 | 1 | (π/3)(3-B) |
| 180°-240° | 0 | 1 | 0 | (π/3)(4-C) |
| 240°-300° | 1 | 1 | 0 | (π/3)(5-A) |
| 300°-360° | 1 | 0 | 0 | (π/3)(6-B) |

8. A metrology system comprising
means for generating an interference fringe pattern as a function of a parameter to be measured,
transducer apparatus for simultaneously generating three intensity-modulated optical signals, $I_R$, $I_S$ and $I_T$, that are related to said interference fringe pattern, said transducer apparatus including a lenticular grating, and the fringe pattern is imaged in the plane of said lenticular grating,
signal processing apparatus for accurately determining an aspect of said interference fringe pattern from said three signals;
means for accumulating phase information proportional to said aspect of said interference fringe pattern; and
means for converting said accumulated phase and aspect information to desired outputs indicative of said parameter to be measured.

9. A metrology system comprising
means for generating an interference fringe pattern as a function of a parameter to be measured, said interference fringe pattern generating means including a laser diode that has a narrow collimated output beam of radiation that is normally incident on the component whose parameter is to be sensed and produces two diffracted beams, and optical means for collecting and bringing said two diffracted beams together again to form interference fringes;
transducer apparatus for simultaneously generating three intensity-modulated optical signals, $I_R$, $I_S$ and $I_T$, that are related to said interference fringe pattern;
signal processing apparatus for accurately determining an aspect of said interference fringe pattern from said three signals;
means for accumulating phase information proportional to said aspect of said interference fringe pattern; and
means for converting said accumulated phase and aspect information to desired outputs indicative of said parameter to be measured.

10. The system of claim 9 wherein said optical means is selected from the group consisting of lenses and prisms.

11. A metrology system comprising
scale structure for mounting on a component whose position is to be sensed;
a radiation source for directing a beam of radiation at said scale structure for producing two separate beams of radiation from portions of radiation modified by said scale structure, optical structure for causing said two beams to interact and form an interference fringe pattern,
transducer apparatus responsive to said interference fringe pattern including for simultaneously generating three intensity-modulated optical signals, $I_R$, $I_S$ and $I_T$, that are related to the position x of said scale structure, said three intensity-modulated optical signals, $I_R$, $I_S$ and $I_T$, being defined by the equations:

$$I_R = I_1 + I_2 \cos(\Phi - 2\pi/3),$$

$$I_S = I_1 + I_2 \cos(\Phi), \text{ and}$$

$$I_T = I_1 + I_2 \cos(\Phi + 2\pi/3),$$

where $I_1$ is the DC component and $I_2$ is the AC component;
electronic hardware for accurately determining the position of said scale structure from said three signals;

means for accumulating phase information proportional to net displacement of said scale structure; and means for converting said accumulated phase and position information to desired outputs indicative of displacement of said scale structure.

12. The system of claim 11 wherein said transducer apparatus includes a laser diode which produces a single beam of linearly polarized light that illuminates said scale structure.

13. The system of claim 11 wherein said scale structure is a ruled scale that has on the order of 20-2000 lines/inch.

14. The system of claim 11 wherein said transducer apparatus includes a laser diode that has a narrow collimated output beam of radiation that is normally incident on said scale structure, said output beam and said scale structure producing two diffracted beams, and optical means for collecting and bringing said two diffracted beams together again to form said interference fringes.

15. The system of claim 11 wherein said electronic hardware includes means for generating ratios A, B, and C, as defined by:

$$A = (R-S)/(T-S),$$

$$B = (S-T)/(R-T), \text{ and}$$

$$C = (T-R)/(S-R),$$

where R is an electrical signal corresponding to the optical intensity signal $I_R$, S is the electrical signal corresponding to the optical intensity signal $I_S$, and T is an electrical signal corresponding to the optical intensity signal $I_T$.

16. The system of claim 15 wherein said means for generating ratios A, B, and C include single A/D-converters that work by digitizing the quantity $(V_{in} - V_o)/(V_{ref} - V_o)$, where $V_{in}$ is the input voltage, $V_{ref}$ is a stable reference voltage, and $V_o$ is the ground level with respect to which $V_{in}$ and $V_{ref}$ are defined, and circuitry for generating a digital representation of the ratio $(R-S)/(T-S)$ includes the following connections to an A/D-converter:

$R \rightarrow V_{in}$ $S \rightarrow V_o$, and $T \rightarrow V_{ref}$.

17. The system of claim 16 wherein said electronic hardware further includes means for generating the Boolean logic values set out in the Boolean logic table below:

| φ-Range | (R > T) | (S > R) | (T > S) | φAPPROX |
|---|---|---|---|---|
| 0°–60° | 1 | 0 | 1 | (π/3)(1-C) |
| 60°–120° | 0 | 0 | 1 | (π/3)(2-A) |
| 0°–180° | 0 | 1 | 1 | (π/3)(3-B) |
| 180°–240° | 0 | 1 | 0 | (π/3)(4-C) |
| 240°–300° | 1 | 1 | 0 | (π/3)(5-A) |
| 300°–360° | 1 | 0 | 0 | (π/3)(6-B) |

18. The system of claim 17 wherein said scale structure is a ruled scale that has on the order of 20-2000 lines/inch.

19. The system of claim 18 wherein said scale structure for mounting on said component whose position is to be sensed is of the crossed-grating type; and said transducer apparatus illuminates said scale structure for simultaneously generating six intensity-modulated optical signals, $I_{R(x)}$, $I_{S(x)}$, $I_{T(x)}$, $I_{R(y)}$, $I_{S(y)}$ and $I_{T(y)}$, that are related to the x and y positions of said scale structure.

20. The system of claim 18 wherein said transducer apparatus includes a laser diode that has a narrow collimated output beam of radiation that is normally incident on said scale structure, said output beam and said scale structure producing two diffracted beams, a lenticular grating, and optical means for collecting and bringing said two diffracted beams together again to form said interference fringes in the plane of said lenticular grating.

21. The system of claim 11 wherein said electronic hardware includes three detectors, and three preamplifier circuits with adjustable gains coupled to said detectors for generating balanced signals R, S, and T.

22. A metrology system comprising scale structure of the crossed-grating type for mounting on a component whose position is to be sensed;

transducer apparatus for simultaneously generating three intensity-modulated optical signals, $I_R$, $I_S$ and $I_T$, that are related to the position x of said scale structure said transducer apparatus illuminating said scale structure for simultaneously generating six intensity-modulated optical signals, $I_{R(x)}$, $I_{S(x)}$, $I_{T(x)}$, $I_{R(y)}$, $I_{S(y)}$ and $I_{T(y)}$, that are related to the x and y positions of said scale structure;

electronic hardware for accurately determining the position of said scale structure from said six signals;

means for accumulating phase information proportional to net displacement of said scale structure; and means for converting said accumulated phase and position information to desired outputs indicative of displacement of said scale structure.

23. A metrology system comprising scale structure for mounting on a component whose position is to be sensed;

transducer apparatus including a lenticular grating for simultaneously generating three intensity-modulated optical signals, $I_R$, $I_S$ and $I_T$, that are related to the position x of said scale structure;

electronic hardware for accurately determining the position of said scale structure from said three signals;

means for accumulating phase information proportional to net displacement of said scale structure; and means for converting said accumulated phase and position information to desired outputs indicative of displacement of said scale structure.

24. The system of claim 23 wherein said lenticular grating is a relatively coarse grating of plastic, and each grating element is of cylindrical lens configuration.

25. A metrology system comprising scale structure for mounting on a component whose position is to be sensed;

transducer apparatus for simultaneously generating three intensity-modulated optical signals, $I_R$, $I_S$ and $I_T$, that are related to the position x of said scale structure, said transducer apparatus including a laser diode that has a narrow collimated output beam of radiation that is normally incident on said scale structure, said output beam and said scale structure producing two diffracted beams, and optical means for collecting and bringing said two diffracted beams together again to form interference fringes including a Wollaston prism and a half-wave plate, electronic hardware for accurately determining the position of said scale structure from said three signals;

means for accumulating phase information proportional to net displacement of said scale structure; and means for converting said accumulated phase and position information to desired outputs indicative of displacement of said scale structure.

26. A metrology system comprising scale structure for mounting on a component whose position is to be sensed;

transducer apparatus for simultaneously generating three intensity-modulated optical signals, $I_R$, $I_S$ and $I_T$, that are related to the position x of said scale structure, said transducer apparatus including a laser diode that has a narrow collimated output beam of radiation that is normally incident on said scale structure, said output beam and said scale structure producing two diffracted beams, and optical means for collecting and bringing said two diffracted beams together again to form interference fringes including a prism-beamsplitter assembly, electronic hardware for accurately determining the position of said scale structure from said three signals;

means for accumulating phase information proportional to net displacement of said scale structure; and means for converting said accumulated phase and position information to desired outputs indicative of displacement of said scale structure.

27. A metrology system comprising scale structure for mounting on a component whose position is to be sensed;

transducer apparatus for simultaneously generating three intensity-modulated optical signals, $I_R$, $I_S$ and $I_T$, that are related to the position x of said scale structure, said transducer apparatus including a laser diode that has a narrow collimated output beam of radiation that is normally incident on said scale structure, said output beam and said scale structure producing two diffracted beams, said transducer apparatus including a lenticular grating, and the fringe pattern being imaged in the plane of said lenticular grating, electronic hardware for accurately determining the position of said scale structure from said three signals;

means for accumulating phase information proportional to net displacement of said scale structure; and means for converting said accumulated phase and position information to desired outputs indicative of displacement of said scale structure.

28. The system of claim 27 wherein said optical means is selected from the group consisting of lenses and prisms.

29. A metrology system comprising scale structure for mounting on a component whose position is to be sensed;

transducer apparatus for simultaneously generating three intensity-modulated optical signals, $I_R$, $I_S$ and $I_T$, that are related to the position x of said scale structure;

electronic hardware for accurately determining the position of said scale structure from said three signals; said electronic hardware including three detectors, three preamplifier circuits with adjustable gains coupled to said detectors for generating balanced signals R, S, and T, and phase processor apparatus to which said balanced signals R, S and T are applied, said phase processor apparatus comprising a plurality of A-D converters and latch circuitry for storing outputs of said A-D converters;

means for accumulating phase information proportional to net displacement of said scale structure; and means for converting said accumulated phase and position information to desired outputs indicative of displacement of said scale structure.

30. The system of claim 29 wherein said electronic hardware further includes low-pass filter circuitry to which said balanced signals R, S and T are applied, each said balanced signal being band-limited with a uniform response from DC to at least about 10 KHz.

31. The system of claim 30 wherein each said detector is a silicon PIN-detector.

* * * * *